(12) United States Patent
Shumaker et al.

(10) Patent No.: US 10,500,968 B2
(45) Date of Patent: *Dec. 10, 2019

(54) SYSTEM FOR CHARGING AN ELECTRIC VEHICLE (EV)

(71) Applicant: AeroVironment, Inc., Simi Valley, CA (US)

(72) Inventors: Scott Ryan Shumaker, Alta Loma, CA (US); Lovlesh Tandon, Azusa, CA (US); Herman Joseph Steinbuchel, IV, Pasadena, CA (US); Robert Salazar, Jr., Alhambra, CA (US); Larry Hayashigawa, Orange, CA (US)

(73) Assignee: WEBASTO CHARGING SYSTEMS, INC., Simi Valley, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/882,799

(22) Filed: Jan. 29, 2018

(65) Prior Publication Data

US 2018/0194242 A1    Jul. 12, 2018

Related U.S. Application Data

(63) Continuation of application No. 14/956,330, filed on Dec. 1, 2015, now Pat. No. 9,914,364.

(Continued)

(51) Int. Cl.
*H02J 7/00* (2006.01)
*B60L 11/18* (2006.01)
(Continued)

(52) U.S. Cl.
CPC ......... *B60L 11/1846* (2013.01); *B60L 3/0069* (2013.01); *B60L 3/04* (2013.01);
(Continued)

(58) Field of Classification Search
CPC ....... Y02E 60/12; H02J 7/0004; H02J 7/0006; H01M 10/48; H01M 10/4257
(Continued)

(56) References Cited

U.S. PATENT DOCUMENTS

2006/0052086 A1    3/2006  Funato
2007/0235519 A1   10/2007  Jang et al.
(Continued)

FOREIGN PATENT DOCUMENTS

KR    20130010638    1/2013

OTHER PUBLICATIONS

International Search Report and Written Opinion for PCT Serial No. PCT/US15/63288, dated Mar. 30, 2016.

*Primary Examiner* — Arun C Williams
(74) *Attorney, Agent, or Firm* — Brooks Acordia IP Law, PC; Michael Zarrabian

(57) ABSTRACT

A method of charging an electric vehicle (EV) includes receiving a user's authentication code in an electric vehicle service equipment (EVSE) from a user's mobile device, comparing in the EVSE the user's authentication code to a whitelist having a plurality of authorized user authentication codes, and enabling an electric vehicle (EV) charging transaction serviced by the EVSE in response to the comparing of the user's authentication code to the whitelist so that a user's authentication code is authenticated to enable the EV charging transaction without concurrent access to an EVSE-related remote server.

14 Claims, 9 Drawing Sheets

Related U.S. Application Data

(60) Provisional application No. 62/086,667, filed on Dec. 2, 2014.

(51) Int. Cl.

| | | |
|---|---|---|
| *G06F 21/31* | (2013.01) | |
| *G06F 21/34* | (2013.01) | |
| *H04L 29/06* | (2006.01) | |
| *H04W 12/06* | (2009.01) | |
| *H04W 12/08* | (2009.01) | |
| *B60L 3/00* | (2019.01) | |
| *B60L 3/04* | (2006.01) | |
| *B60L 53/16* | (2019.01) | |
| *B60L 53/30* | (2019.01) | |
| *B60L 53/63* | (2019.01) | |
| *B60L 53/65* | (2019.01) | |
| *B60L 58/21* | (2019.01) | |
| *H04W 88/06* | (2009.01) | |
| *H04W 4/04* | (2009.01) | |
| *H04W 4/40* | (2018.01) | |

(52) U.S. Cl.
CPC ............ *B60L 53/16* (2019.02); *B60L 53/30* (2019.02); *B60L 53/305* (2019.02); *B60L 53/63* (2019.02); *B60L 53/65* (2019.02); *B60L 58/21* (2019.02); *G06F 21/31* (2013.01); *G06F 21/34* (2013.01); *H04L 63/08* (2013.01); *H04W 12/06* (2013.01); *H04W 12/0608* (2019.01); *H04W 12/08* (2013.01); *B60L 2240/70* (2013.01); *H02J 2007/0001* (2013.01); *H04L 63/0853* (2013.01); *H04L 63/101* (2013.01); *H04L 63/18* (2013.01); *H04W 4/046* (2013.01); *H04W 4/40* (2018.02); *H04W 88/06* (2013.01); *Y02D 70/00* (2018.01); *Y02D 70/142* (2018.01); *Y02D 70/144* (2018.01); *Y02D 70/166* (2018.01); *Y02E 60/721* (2013.01); *Y02T 10/7005* (2013.01); *Y02T 10/7061* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
USPC ........................................................ 320/106
See application file for complete search history.

(56) References Cited

U.S. PATENT DOCUMENTS

| | | | |
|---|---|---|---|
| 2009/0113539 A1* | 4/2009 | Shu | H04L 12/2821 726/12 |
| 2012/0291102 A1 | 11/2012 | Cohen | |
| 2012/0326668 A1 | 12/2012 | Ballatine et al. | |
| 2013/0141044 A1 | 6/2013 | Solomon et al. | |
| 2014/0067680 A1 | 3/2014 | Turner | |
| 2014/0134996 A1* | 5/2014 | Barclay | H04W 24/08 455/422.1 |
| 2017/0043674 A1 | 2/2017 | DeBoer | |
| 2017/0282747 A1* | 10/2017 | Wang | B60L 53/14 |

\* cited by examiner

SYSTEM FOR CHARGING AN ELECTRIC VEHICLE (EV)

CROSS-REFERENCE TO RELATED APPLICATIONS

This application is a continuation of U.S. patent application Ser. No. 14/956,330, filed Dec. 1, 2015, which claims priority to and the benefit of U.S. Provisional Patent Application No. 62/086,667, filed Dec. 2, 2014, the contents of which are hereby incorporated by reference herein for all purposes.

BACKGROUND

Field of the Invention

The field of the invention relates to portable and fixed electric vehicle supply equipment (EVSE).

Description of the Related Art

A charging station or Electric Vehicle Supply Equipment (EVSE) is used to provide high levels of power to electric vehicles (EVs) safely by only energizing the EVSE's power cable and supplying power to the EV when the EVSE detects that it is connected to an EV. In addition to the wires for carrying the electricity from the EVSE to the EV, the EVSE's power cable has a pilot line, which when the EVSE is plugged into an EV, connects the EVSE's and the EV's control systems and allows communication. The EVSE will only supply power when the EV is connected to the EVSE, and the EVSE will automatically shut off the power to the EV when the EVSE is disconnected from the EV.

When installed in a public location, turning the EVSE's power on may require an external authorization from a home office. This external authorization allows the EVSE's owner/operator to control who may use the EVSE, how long it may be used, as well as to obtain payment for its use. One example of such an EVSE system is shown in FIG. 1 (prior art), where an EVSE system 100 includes a connector 105, such as a J1772 compliant connector for connecting to an EV 145, a power cable 110 for communicating power and communications to the EV 145, a power switch or relay 115 to switch AC power between a utility power supply 120 and the connector 105, an EVSE control system 125 for selectively switching on/off the power switch 115, a system box 130 encompassing the power switch 115 and EVSE control system 125, a control interface 135 to accept input from a user, a pilot line 140 for communication between a connected EV 145 and the EVSE control system 125, a user activation card 150, a wireless communication system 155 for the EVSE control system 125 to communicate back to an EVSE home office 160 through a wireless connection 165 that includes a cell tower 167, and a wired communication system 170 for the EVSE control system 125 to communicate back to an EVSE home office 160 without a wireless connection 165. Upon connection to the EV 145, the EVSE system 100 may be activated by either using the control interface 135, such as a keypad or a touch screen and/or via the activation card 150, such as an RFID card. The interface 135 is connected to the control system 125 which can activate the power switch 115 to switch power to the EV 145. When authorization is required, the EVSE control system 125 will use the wired communication 170 to contact a home office 160 via a two-way communication system such as a telephone connection or via an internet connection. Alternatively, the control system 125 can use the wireless system 155 to contact the home office 160, where the wireless system 155 is a cell phone system.

Another activation method is for the user to use his/her cell phone 175 to either call the home office 160 or, in the case of a smart phone, to wirelessly connect to the home office 160 via the internet (typically using a phone number or website set forth on the system box 130). Upon authorization (and typically payment), the home office 160 will then signal the EVSE control system 125, via either the wired 170 or wireless 165 connections, to activate the charging of the EV.

As can be seen, regardless of the means (cell phone or control interface) that the user uses to interface with the EVSE system 100, to obtain authorization to charge the EV requires that either the wired 170 or wireless 155 connections be in place and functioning. Such wired or wireless connection can be expensive and time consuming to install and operate and their operations may be limited by bandwidth restrictions.

SUMMARY

A method of charging an electric vehicle (EV) includes receiving a user's authentication code in an electric vehicle service equipment (EVSE) from a user's mobile device, comparing in the EVSE the user's authentication code to a whitelist having a plurality of authorized user authentication codes, and enabling an electric vehicle (EV) charging transaction serviced by the EVSE in response to the comparing of the user's authentication code to the whitelist so that a user's authentication code is authenticated to enable the EV charging transaction without concurrent access of the EVSE to an EVSE-related remote server. The method may also include receiving the whitelist in the EVSE from an administrator mobile device so that the EVSE receives the whitelist without concurrent access to an EVSE-related remote server. The step of receiving the whitelist may also include receiving the whitelist wirelessly from a mobile device, and the mobile device may be a smartphone. In some embodiments, the step of receiving a whitelist includes receiving the whitelist from a smartphone having a direct wired connection with the EVSE. The method may include providing power through a power cable in response to enabling the EV charging transaction. In such embodiments, the method may also include receiving a second occurrence of the user's authentication code in the EVSE from the user's mobile device and sending by the EVSE an electrical current indication to the user's mobile device of a previous EV charging transaction in response to receiving the second occurrence of the user's authentication code. Or, the method may include receiving a second occurrence of a user's authentication code in the EVSE from a user's mobile device in response to connecting the EVSE to the mobile device and sending by the EVSE a current indication to the user's mobile device of a previous EV charging transaction in response to receiving the second occurrence of the user's authentication code. Connecting the EVSE to the mobile device wirelessly and automatically as the mobile device comes within wireless range of the EVSE may be part of the inventive method, and may include providing power through the power cable for up to 10 hours in response to the enabling of the EV charging transaction.

A method is also disclosed for charging an electric vehicle (EV), that includes receiving a user's authentication code in a wireless interface module from a user's mobile device, the Bluetooth interface module in communication with an electric vehicle service equipment (EVSE), comparing in the wireless interface module the user's authentication code to a whitelist stored in the wireless interface module, the whitelist having a plurality of authorized user authentication codes, and enabling an EV charging transaction serviced by the EVSE in response to the comparison of the user's authentication code to the whitelist so that a user's authentication code is authenticated to enable the EV charging transaction without concurrent access to an EVSE-related remote server. The wireless interface module may be selected from the group consisting of a Bluetooth wireless module and Wi-Fi wireless module. The user's authentication code may be received in the wireless interface module directly from the user's mobile device. The method may also include providing power through a power cable in response to enabling the EV charging transaction and, in such embodiments, the method may include receiving a second occurrence of the user's authentication code in the wireless interface module from the user's mobile device and sending by the wireless interface module an electrical current indication to the user's mobile device of a previous EV charging transaction in response to receiving the second occurrence of the user's authentication code.

A method of using a mobile device to control charging of an electric vehicle (EV) may include entering a user authentication code into a mobile device, establishing a wireless communication between an electric vehicle service equipment (EVSE) and the mobile device, sending the user's authentication code from the mobile device to the EVSE, and receiving in the mobile device a charge amount indication. The charge amount indication may be a current indication and current charge time. Alternatively, the charge amount indication may be a total power consumed indication. The method may also include receiving in the mobile device an EVSE invitation to connect signal, accepting the EVSE invitation to connect signal, requesting by the mobile device an electric vehicle (EV) charge rate from a charge rate service provider, and receiving the EV charge rate in the mobile device. The step of sending the user's authentication code from the mobile device to the EVSE may be made in response to selection of a charge rate.

An electrical vehicle service equipment (EVSE) apparatus may include a wireless personal area network (PAN) module, an electric vehicle service equipment (EVSE) control module in electrical communication with the PAN module, a pilot line in communication with the EVSE control module, and an EVSE power relay in communication with the EVSE control module. The PAN module may be in communication with the EVSE control module through the pilot line. The EVSE control module may include the PAN module. In some embodiments, the EVSE power switch may be seated in an EVSE control box and the EVSE control box may be detachably coupled to a power receptacle. In other embodiments, the PAN module may be a Bluetooth interface module or a Wi-Fi interface module.

BRIEF DESCRIPTION OF THE DRAWINGS

The components in the figures are not necessarily to scale, emphasis instead being placed upon illustrating the principles of the invention. Like reference numerals designate corresponding parts throughout the different views.

DETAILED DESCRIPTION

A system is disclosed for charging an electric vehicle (EV) in a manner that enables local authorization of EV charging without the need to provide the EVSE with installed wired or cellular wireless communications for distant authorization of EV charging from an EVSE home office. A user's authentication code may be provided to the EVSE directly from the user's mobile device, the EVSE may compare the user's authentication code to a whitelist previously loaded into the EVSE by a local administrator mobile device, and the EV charging transaction may be enabled in response to an affirmative comparison of the EVSE user's authentication code to the authorization codes stored in the EVSE's whitelist. Upon completion of the EV charging transaction or at a later date, the user's mobile phone may again be used to upload the transaction to the EVSE home office for processing.

Figure 2:
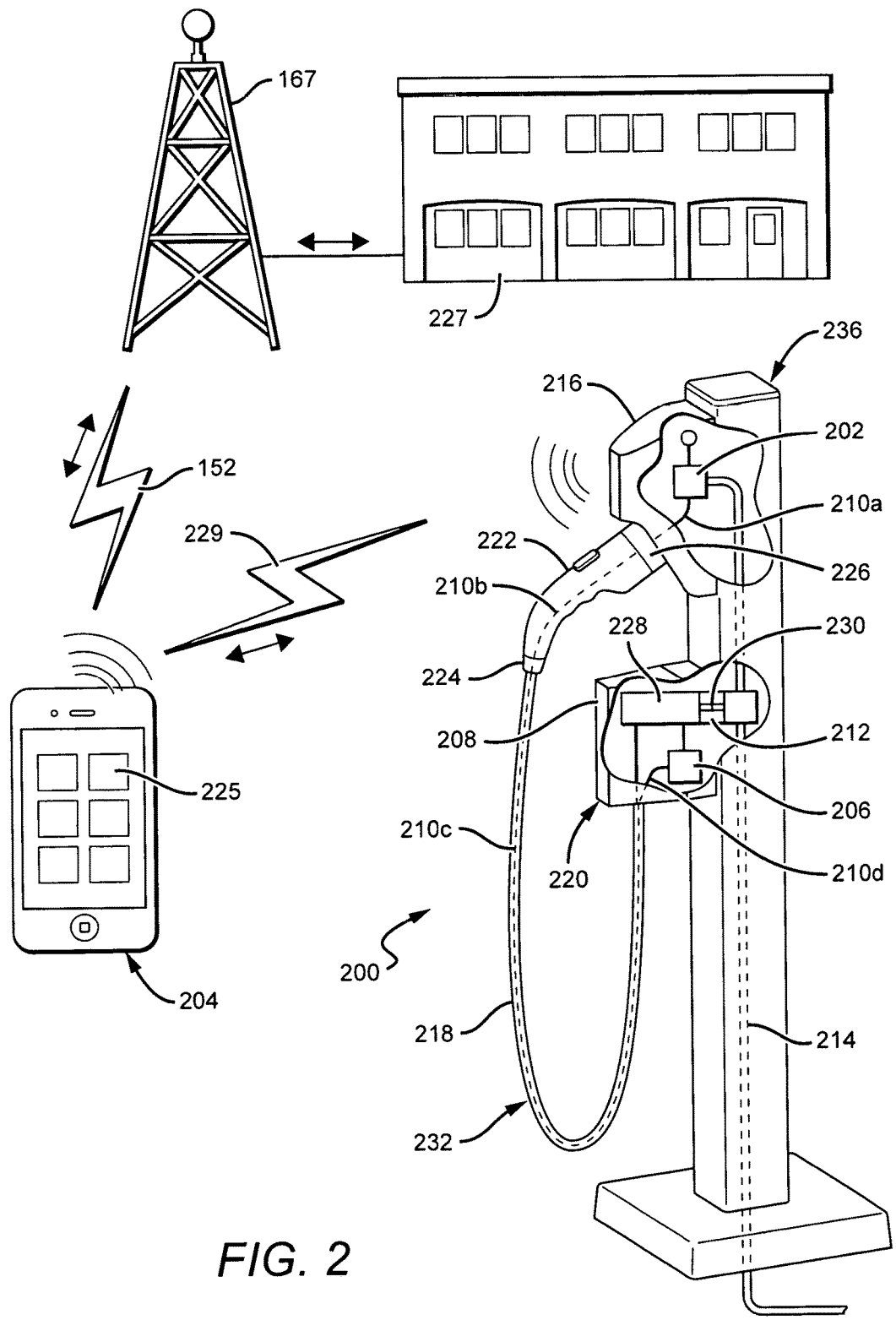
FIG. 2 illustrates one embodiment of an EVSE system that has neither a wired nor cellular wireless communication link to an EVSE office, but that enables remote authentication and subsequent data transmission of an EV charging transaction through a user's mobile device, with the EVSE system having a portable cord set.

FIG. 2 illustrates one embodiment of an EVSE 200 that enables remote authentication and subsequent data transmission of an EV charging transaction without the benefit of wired or cellular connections between the EVSE and an EVSE home office, and with a cord set that is detachable from an EVSE pedestal and so made portable for users. A wireless interface module 202 is in communication with an EVSE control module 206 seated in an EVSE control box 208 through pilot line segments (210a, 210b, 210c, 210d) (alternatively referred to as a "pilot line"). The EVSE control box 208 is itself detachable by a user from a wall outlet 212 that is electrically connected to a utility line 214. As used herein, a "wireless interface module" refers to a wireless interface module adapted for exchanging information over short distances to a mobile device, such as through using short-wavelength ultra-high frequency (UHF) radio waves in the industrial, scientific and medical (ISM) radio bands (i.e., Bluetooth) or super high frequency (SHF) ISM radio bands (i.e., Wi-Fi) as designated by the International Telecommunication Union (ITU), and specifically excludes cellular radio tower technologies intended for voice and data traffic and other wide-area network (WAN) technologies. Such short-range technologies may generally form a personal area network (PAN) or a local area network (LAN) when used in combination with one or more mobile devices and/or EVSEs. In one embodiment, the wireless interface module 202 is a Bluetooth (BT) interface module seated in a wireless interface module control box 216. Pilot line segment 210c is disposed in a power cable 218, with the power cable 218 fixedly coupled to the EVSE control box 208 on a first end 220, and to a connector 222, such as a J1772 compliant connector, on its other end 224. The mobile device 204 may be running an EVSE mobile application 225, the mobile device 204 and EVSE mobile application collectively referred to as a "mobile device." The mobile device may be in periodic communication with an EVSE home office 227 through either a cellular communication path 152 that includes the cell tower 167, or through another means such as the EVSE user's or an EVSE owner's local area network (LAN). The mobile device may also be in periodic communication with the wireless interface module 202 through a short-range wireless connection 229 formed by the BT interface module.

As illustrated in FIG. 2, the connector 222 is detachably seated in and mated to a receptor 226 of the wireless interface module control box 216 so that a pilot line terminal (not shown) on the connector 222 and a complementary pilot line terminal (not shown) on the receptor 226 are detachably and electrically coupled together to electrically connect the pilot line segments (210a, 210b, 210c, 210d) to establish a complete pilot line signal path between the wireless interface module 202 and the EVSE control module 206. A power relay (alternatively referred to as a power switch) 228 in the EVSE control box 208 may be electrically connected to the connector 222 through the power cable 218 on an EV side of the power switch 228, with the other side of the power switch 228 detachably and electrically coupled to the wall outlet 212 through a plug 230, such as a NEMA 515, 520, 615 or 620 plug.

For purposes of clarity, the EVSE 200 may be defined as including two primary components, namely a cord set 232 and an EVSE pedestal 236. The cord set 232 may include the connector 222; the power cable 218 having the pilot line segments (210b, 210c); and the EVSE control box 208 that contains the EVSE control module 206, the power switch/relay 228 and a pilot line segment 210d. The EVSE control box 208 may also have a plug 230 for plugging the cord set 232 into the wall outlet 212 that provides the utility power. In one embodiment, the EVSE pedestal 236 may include the wireless interface module control box 216 encompassing the wireless interface module 202, a segment of the pilot line 210a, and the receptor 226 for receiving the connector 222 of the cord set 232. As illustrated in FIG. 2, the cord set 232 may be portable and so can be removed from the pedestal 236 to be used at any other compatible outlet. Also, the cord set 232 may be manufactured en masse for use as either separate portable devices and/or attached to a pedestal 236 and used in the EVSE 200, allowing the manufacturing cost of the cord set 232 to be reduced. Also, with the cord set 232 and the pedestal 236 being separate (as viewed by the user), the pedestal 236 may be installed prior to the delivery and connection of the cord set 232. An example of a cord set such as that set forth as cord set 232 is the TurboCord EVSE which is commercially available from AeroVironment, Inc. of Monrovia, Calif. USA (www.avinc.com). A cord set is described in International Application Number: PCT/US13/56871, PCT Publication No. WO 2014036013, which is hereby incorporated by reference in its entirety, and in International Application Number: PCT/US2014/029624, PCT Publication No. WO 2014144990, which is hereby incorporated by reference in its entirety, and in US Patent Application Publication No. 20140035527, which is hereby incorporated by reference in its entirety.

Figure 3:
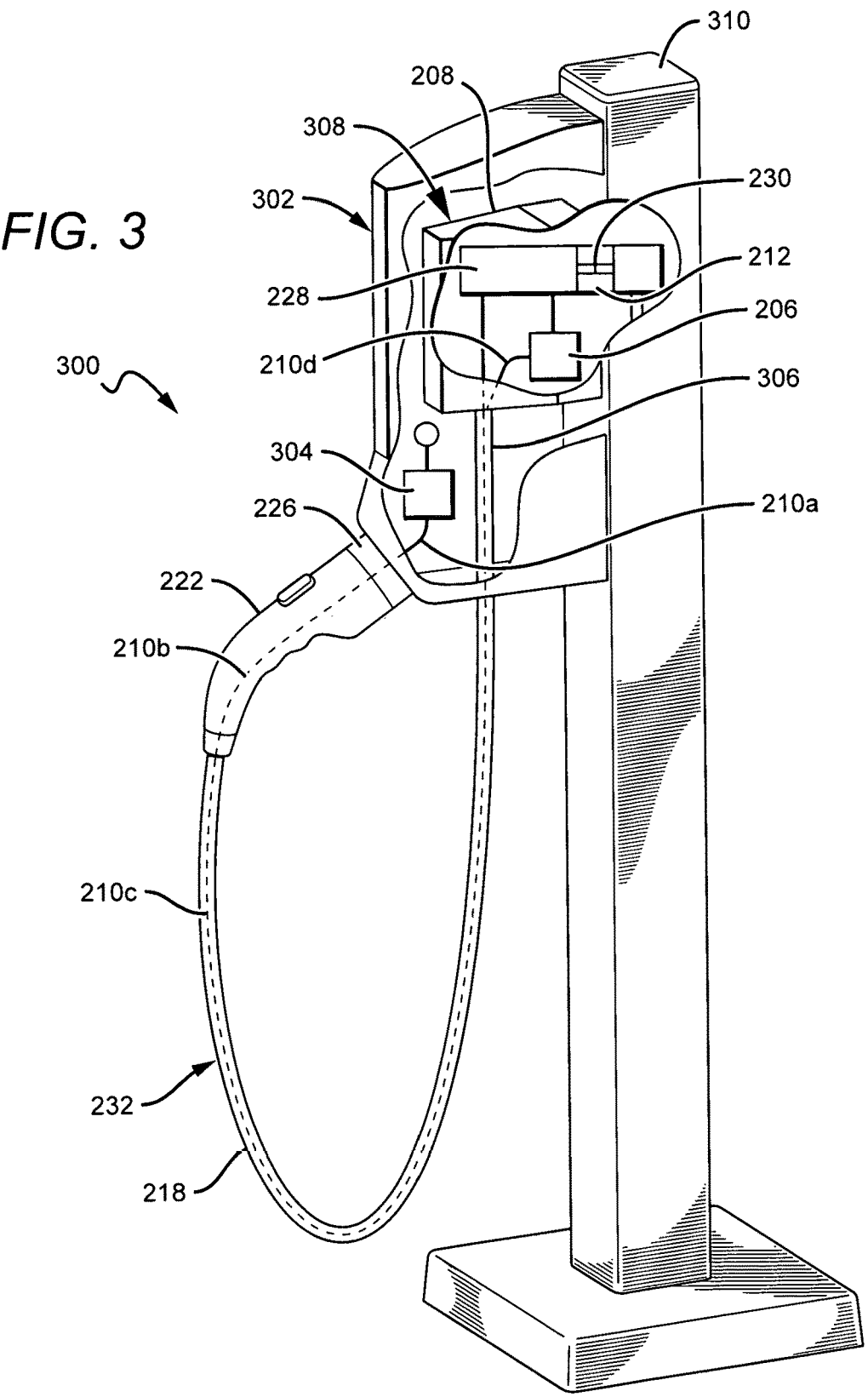
FIG. 3 illustrates another embodiment of EVSE system that enables remote authentication and subsequent data transmission of an EV charging transaction through a user's mobile device, with the EVSE system having a non-portable cord set.

FIG. 3 illustrates another embodiment of an EVSE 300 that enables remote authentication of an EV charging transaction without the benefit of wired or wireless connections made by the EVSE to an EVSE home office, and with a cord set that is not intended for portable use by a user. Communication between a mobile device (not shown) and the EVSE control module 206 is enabled when the connector 222 of the EVSE power cable 218 is mated to the complementary receptor 226 of an EVSE cover 302. More particularly, when the connector 222 of the power cable 218 is electrically coupled to the receptor 226 of the EVSE cover 302, a pilot line (segments 210a, 210b, 210c, 210d) enables electrical communication between a wireless interface module 304, such as a Wi-Fi (wireless local area network (WLAN)) interface module disposed in the EVSE cover 302 and the EVSE control module 206 seated in the EVSE control box 208 that is itself disposed in the EVSE cover 302. The power relay 228 disposed in the EVSE control box 208 may be electrically connected between the connector 222 and the wall outlet 212 through the plug 230. Unlike the embodiment illustrated in FIG. 2, the cord set consisting of the power cable 218, power cable connector 222 and the EVSE control box 208 (enclosing the EVSE control module 206 and the power relay 228) are not available to a standard user to detach from the wall outlet 212, as a portion 306 of the power cable 218 and the EVSE control box 208 extend into an interior 308 of the EVSE cover 302 that is normally locked or otherwise fixed to a pedestal 310, thus inhibiting access to the interior 308 of the EVSE cover 302.

Figure 4:
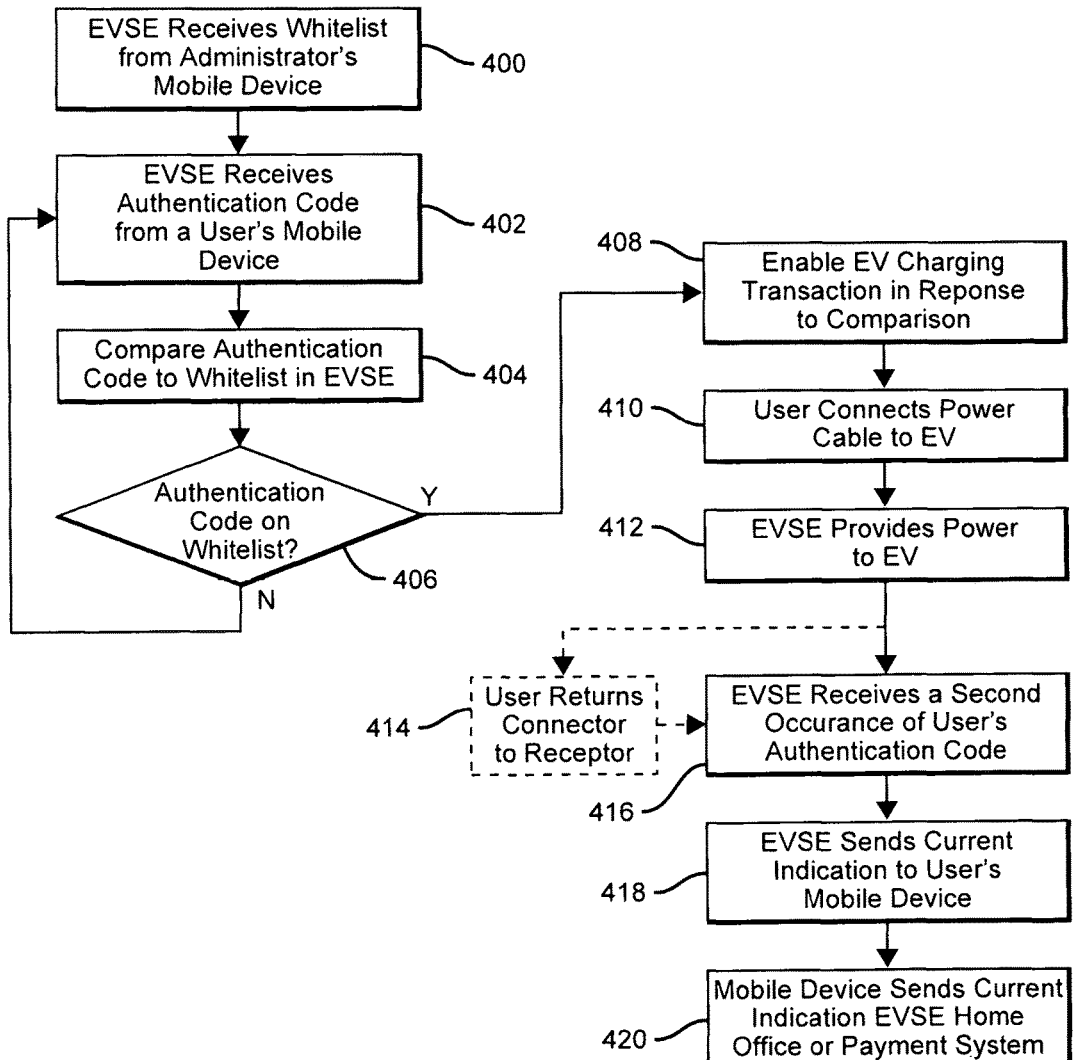
FIG. 4 is a flow diagram of one embodiment of a method of administering and using an EVSE with mobile devices.

FIG. 4 illustrates one embodiment of a method of administering and using an EVSE with mobile devices. Subsequent to purchase or installation of the EVSE and an associated pedestal (if required) at a permanent use location, or periodically after installation, the EVSE may receive a whitelist from an administrator's mobile device (block 400), with the whitelist including user authentication codes representing users that are authorized to charge from the EVSE, such as the EVSE owner's employees. Generation or transmittal of the whitelist may be made by an EVSE mobile application running on or through the administrator's mobile device, such as a smartphone. Such a transmission may be received by a wireless interface module in the EVSE, such as a Bluetooth interface module apart from an EVSE control module, or by an EVSE control module having short-range wireless capability in the EVSE. After such setup and during normal use, the EVSE may broadcast an invitation for mobile devices to connect. A user that wants to initiate an EV charging transaction (i.e., desires to charge their EV) may push or otherwise send an authentication code to be received in the EVSE's wireless interface module or wirelessly in an EVSE control module adapted to receive such communications directly (block 402). The user's authentication code is compared to the authorization codes previously uploaded and existing in the whitelist in the EVSE (block 404). If the user's authentication code is not on the whitelist (block 406), the EVSE may prompt the user to again enter the authentication code or may send an authorization failed message. Or, if the user's authentication code is found on the whitelist (block 406), an EV charging transaction may be enabled (block 408) in response to the comparison. The user may disconnect the connector from the receptor and plug it into the EV's charge port to complete connection of the power cable between the EVSE and the EV (block 410). The EVSE may provide power to the EV such as may be controlled through a pilot channel established between the EV and EVSE (block 412). In one embodiment, an EV charging authorization results in up to a 10-hour charge authorization for the user.

At the conclusion of charging, the user may disconnect the EVSE's power cable from the EV and return the associated connector to the receptor on the EVSE (block 414). Preferably, the EVSE may again receive the user's authentication code (block 416) to re-establish communication to send a current indication and current charge time to the user's mobile device (block 418) that is an indication of the total charge delivered by the EVSE to the user's EV (alternatively referred to as a charge amount indication). In an alternative embodiment, only a current indication is provided to the user's mobile device. In further embodiments, the charge amount indication is a total power consumed indication. With the current indication received, the mobile device may then send the current indication (or total power consumed indication) to an EVSE home office or to a payment system so that the user may be charged or otherwise debited for the EV charge transaction (block 420). In one embodiment, the communication between the mobile device and the EVSE is reestablished (block 416) immediately upon conclusion of EV charging so the EVSE home office or payment system may receive the current indication through the user's mobile device immediately upon conclusion of the EV charging transaction. In another embodiment, communication between the mobile device and the EVSE is reestablished at a subsequent time, such as at initiation of a subsequent EV charging session or transaction, and so the current indication is not immediately provided by the EVSE to the user's mobile device. In another embodiment, the user's mobile device does not immediately provide the received charging indication to the EVSE home office or payment system, but rather stores the data for later transmission, such if the mobile device is not immediately within range of cellular service.

Figure 5:
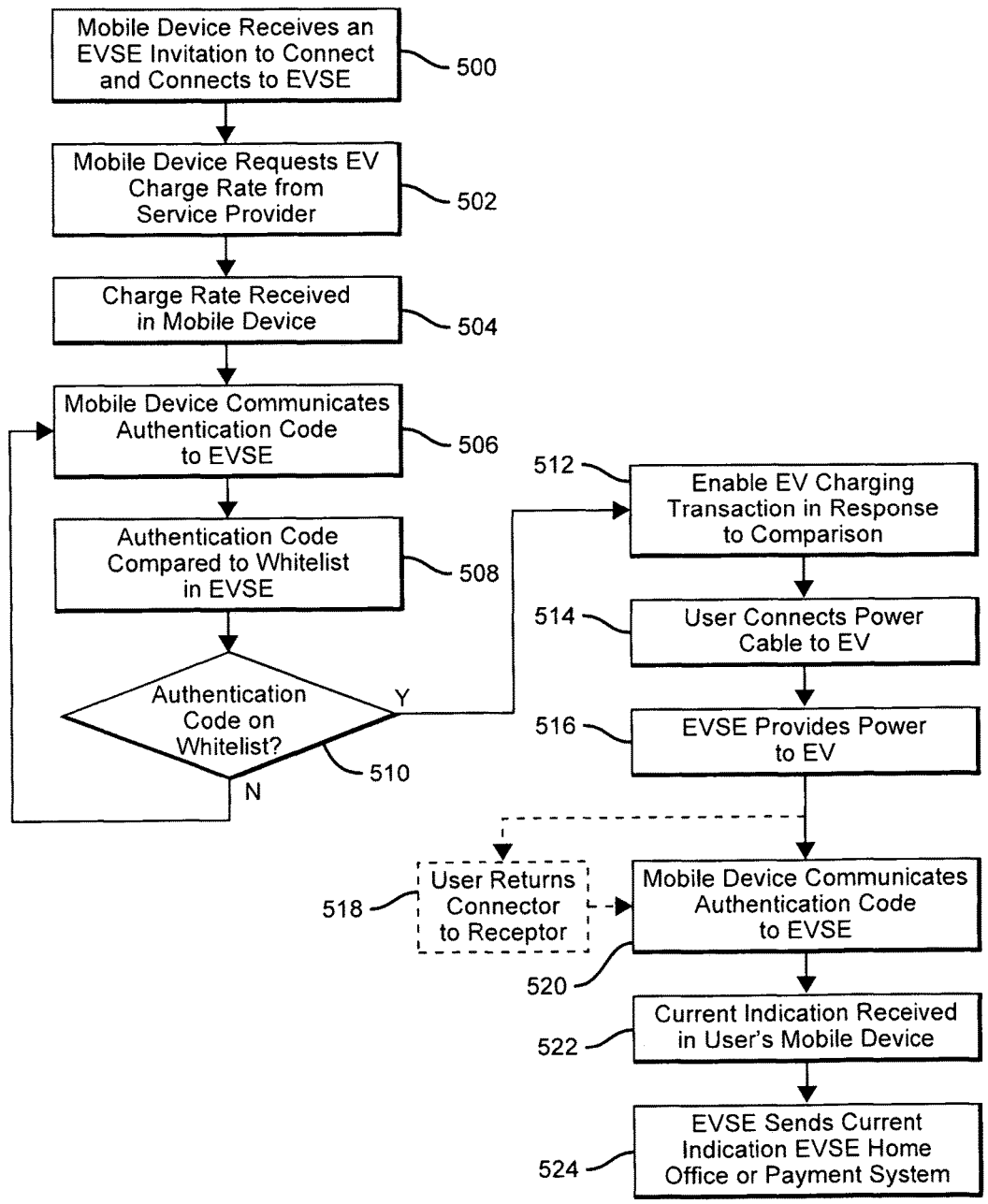
FIG. 5 is a flow diagram of one embodiment of a method of using a mobile device with EVSEs.

FIG. 5 is a flow chart describing one embodiment of a method of using a mobile device with EVSEs. A mobile device may receive and process an EVSE invitation to connect from a wireless interface module or EVSE control module of the EVSE, and may subsequently connect to the EVSE (block 500) through a handshaking process. The mobile device may request an EV charge rate from a service provider (block 502). The charge rate may be received in the mobile device (block 504) concurrently with the request if connected to cellular network, or be referenced internally if such was provided during a previous download, and the rate approved or otherwise selected by the user. The user may communicate an authentication code to the EVSE (block 506) through or as stored within their mobile device. In one embodiment, the mobile device is also provided with approval for an EV charging transaction by the EVSE Home Office or Payment System as a further authentication/permissions step prior to EV charging. In such an embodiment, the EV charging transaction approval may be provided to the mobile device prior to communicating the authentication code to the EVSE as a two-step authentication process.

The authentication code may be compared to the whitelist in the EVSE (block 508). If the authentication code is on the whitelist (block 510), an EV charging transaction may be enabled (i.e., an authorized EV charging session) in response to the comparison (block 512). Otherwise (block 510) the EV charging transaction fails and the mobile device may present the user with further opportunities to provide another authentication code. The user may connect the EVSE power cable to the EV (block 514) and the EVSE may provide power to the EV (block 516). Upon conclusion of the charging session, the user may return the connector on the power cable to the receptor on the EVSE (block 518). The mobile device may communicate the authentication code to the EVSE (block 520) either concurrently with the end of the EV charging transaction or at a later time, such as at the beginning of a subsequent EV charging transaction, and a current indication may be received in the user's mobile device (block 522). The mobile device may send the current indication on to the EVSE home office or to another payment system through its connected cellular network (block 524) or through other means such as a local wide area network (WAN), or at a later time if such a cellular or long-range network isn't currently available to the mobile device.

As may be appreciated from the description, above, the EVSE system 200 may operate without having any connection back to the home office 227 at the time an EV charging transaction is initiated. In such embodiments, the application 225 is provided with an authorization from the EVSE owner or from the home office 227 at a time prior (e.g. days, weeks, months prior) to the initiation of the charge session, and then with the mobile device 204 in short-range communication with the EVSE control module 206 (such as through a Bluetooth or Wi-Fi connection, the EVSE mobile application 225 may provide the charging session authorization directly. In this manner, charging can occur even if a cellular connection cannot be made by the mobile device 204 (e.g., the EVSE 200 is in a location without cellular service—a dead spot). In such situations, the EVSE mobile application 225 will also function to record information about the changing session to later relay to the EVSE home office 227 or to an acquiring bank that processes credit or debit card payments on behalf of the EVSE owner or the EVSE home office, when a connection can be reestablished. Such stored and relayed information may include: duration of the charging session, time of charging, power provided to the EV, rate for charging at the EVSE 200, and the like. At periodic times the EVSE mobile application 225 will seek to contact the EVSE home office 227 to update the user's charging authorization and/or to transfer stored information from prior charging sessions.

In embodiments, the present invention has the EVSE control module 206 in communication with the wireless interface module 202 via the pilot line (210a, 210b, 210c, 210d), such that information such as charging authorization, initiation of charging, terminating charging, duration of session, power supplied, charging rates, and the like can be transferred to and from the wireless and EVSE control modules (202, 206) while the connector 222 is electrically coupled to the receptor 226. In some embodiments the wireless and EVSE control modules (202, 206) are not separate modules, but have both functions implemented in the same module and are directly connected to the EVSE's power switch/relay 228. In other embodiments, as shown in FIG. 2, the wireless and EVSE control modules (202, 206) are separate and communicate via the pilot line (210a, 210b, 210c, 210d). In such embodiments, when the EVSE 200 is not connected to the EV, the power cord connector 222 can be plugged into a receptor 226 that includes a wired connection to the wireless interface module 202, such that the pilot line (210a, 210b, 210c, 210d) provides communication between the wireless interface module 202 and the EVSE control module 206 so the EVSE box 208 can be sealed without the need for an external connection port for the transfer of data, improving its weatherproofing and reducing its cost of manufacture.

In other embodiments, the EVSE control system, such as the wireless and EVSE control modules (202, 206), do not need to have a real time clock in order to generate a current indication, as such a clock can be simulated by using the communication with the user's smart phone or may be generated using a timer function without real-time clock data. In an alternative embodiment, generation of data logs enable recalculation of the EVSE's clock during communication with the smart phone. The lack of a real time clock can further reduce the cost to manufacture the EVSE, and are not necessary to produce EV transaction data such as total time charged.

In one example operation of the EVSE system 200, a user parks their EV near the available EVSE 200, and then opens (e.g., runs), the EVSE mobile application 225 on their cellular phone 204. The EVSE mobile application 225 and cellular phone look for EVSEs in the range of the local/short range radio (i.e., within the Bluetooth or WiFi reception capability of the cellular phone) and presents these to the user to choose from. Each EVSE has a physical identifier that corresponds to an identifier transmitted via wireless interface module 202 for visual comparison by the user, such as a serial number on a front face of the EVSE or an EVSE name or logo. In so doing, the cellular phone 204 may use the signal strength of the wireless interface module 202 to aid in finding the EVSE that the user wants to use, namely the closer the EVSE is to the phone 204, the greater the radio signal strength indicated in the EVSE mobile application 225 user interface.

In other embodiments, the application 225 may have received prior authorization for the use of the EVSE 200 or may contact the home office 227 via the cellular connection 152 to obtain authorization. Then, the EVSE mobile application 225 communicates, via the local wireless connection 229, to the wireless control model 202 to provide the charge authorization. The wireless control system 202 in turn communicates via the pilot line (210a, 210b, 210c, 210d) to the EVSE control module 206 to provide the charge authorization. Then upon connection of the connector 222 to an EV (and a pilot signal is properly communicated between the EV and the EVSE 200), the EVSE control module 206 instructs the power relay 228 to provide electric power from the utility line 214 to the EVSE power cable 218 and the connector 222. The EVSE control module 206 may also direct the switch to terminate supplying power when the charging transaction is over, such as when the authorized duration of the charge reaches the value provide by the home office 227 or EVSE owner via the EVSE mobile application 225 to the wireless interface module 202.

In addition to providing charging authorization and charging related data between the home office 227 and the EVSE 200, via the EVSE mobile application 225 on the phone 204, additional information can be sent that is not seen by the user. This additional information may include software updates, settings, diagnostics, information to show on a display on the EVSE 200, such as pricing, advertising, user feedback, etc. This information can be sent not just to the EVSE 200 that the user is using or intends to use, but also to all EVSEs within range of the wireless connection from the phone 204.

In this embodiment, to obtain charging authorization the EVSE system 200 utilizes the user's cellular phone 204 to communicate back to the EVSE home or back office 227, via a wireless connection through a cellular system 152 (in other embodiments the connection between the phone 204 and the EVSE home office 227 can be made by any of a variety of known means, including via Wi-Fi or a wired connection such as a phone land line). In embodiments the phone 204 (alternatively referred to as a smartphone) is operable to hold the user's financial information (e.g., credit card number) and funds for charging sessions, which can be based on tokens, thus eliminating the need to pass financial and credit card information to the charger and/or to the home or back office.

Figure 1:
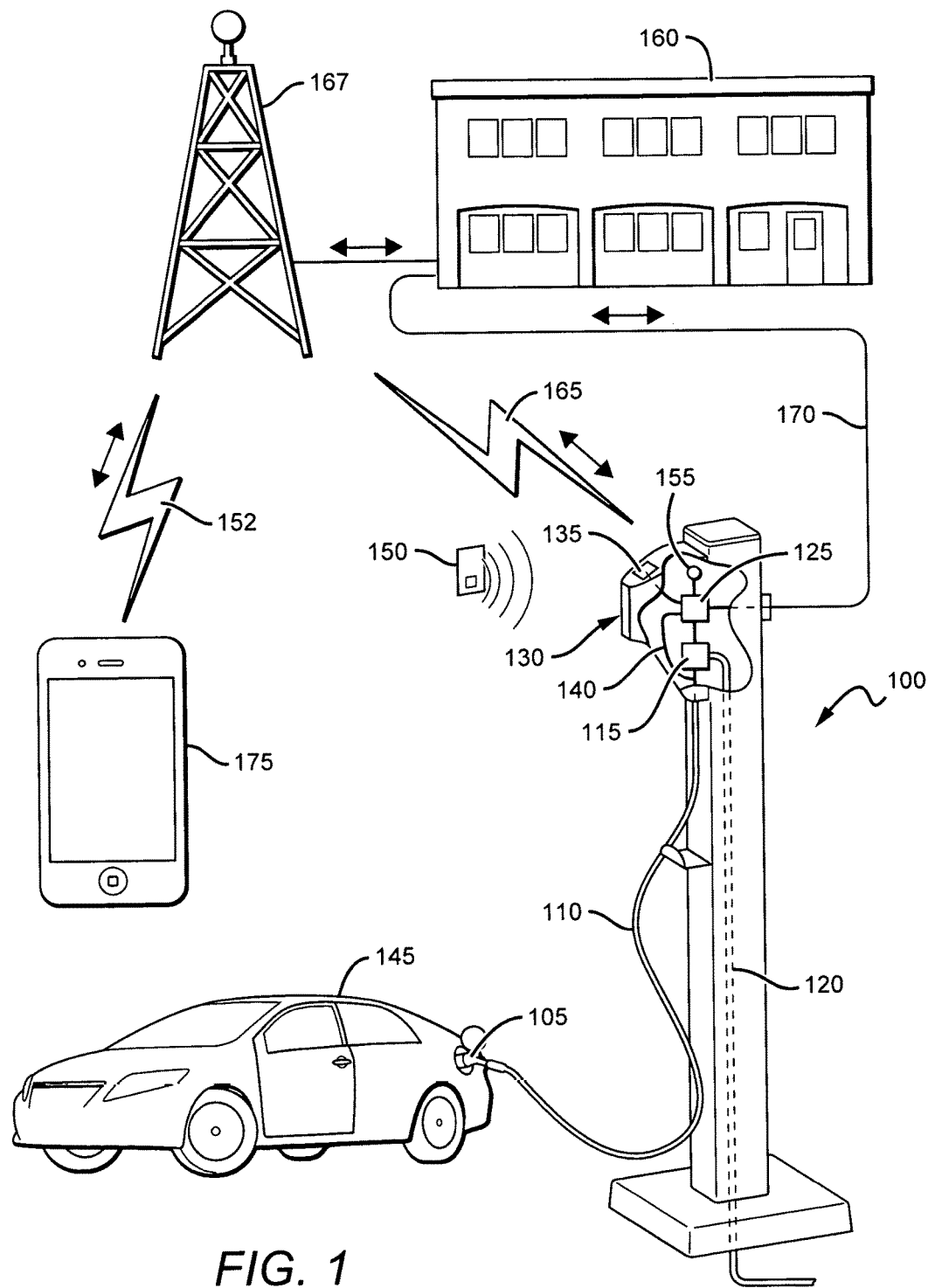
FIG. 1 illustrates a prior art EVSE system that is in communication with an EVSE home office through both wired and cellular wireless communication links.

The cellular phone 204 can achieve this authorization by employing an EVSE mobile application 225 that is loaded and operating on the phone 204. The phone 204 in turn communicates with the wireless interface module 202 via a wireless connection 229 through the wireless controller module 202 to provide the EVSE control module 206 with authorization for the charging session (a "EV charging transaction"). Since the user is expected to be located relatively close to the EVSE system 200, the wireless connection 229 can be any of known local, or short range, wireless communication means including Bluetooth or Wi-Fi. The use of such a short range communication 229 allows the cost to manufacture the EVSE system 200 to be reduced compared to using a cellular connection 165 (see FIG. 1). The installation cost of the EVSE 200 may be reduced as a wired or land-line cabling 170 is likewise not required. Further, the continuing operation costs of the EVSE system 200 is reduced as neither a cellular service or wired (landline) subscription is required to contact the home office 227 to obtain charging authorization.

Figure 6:
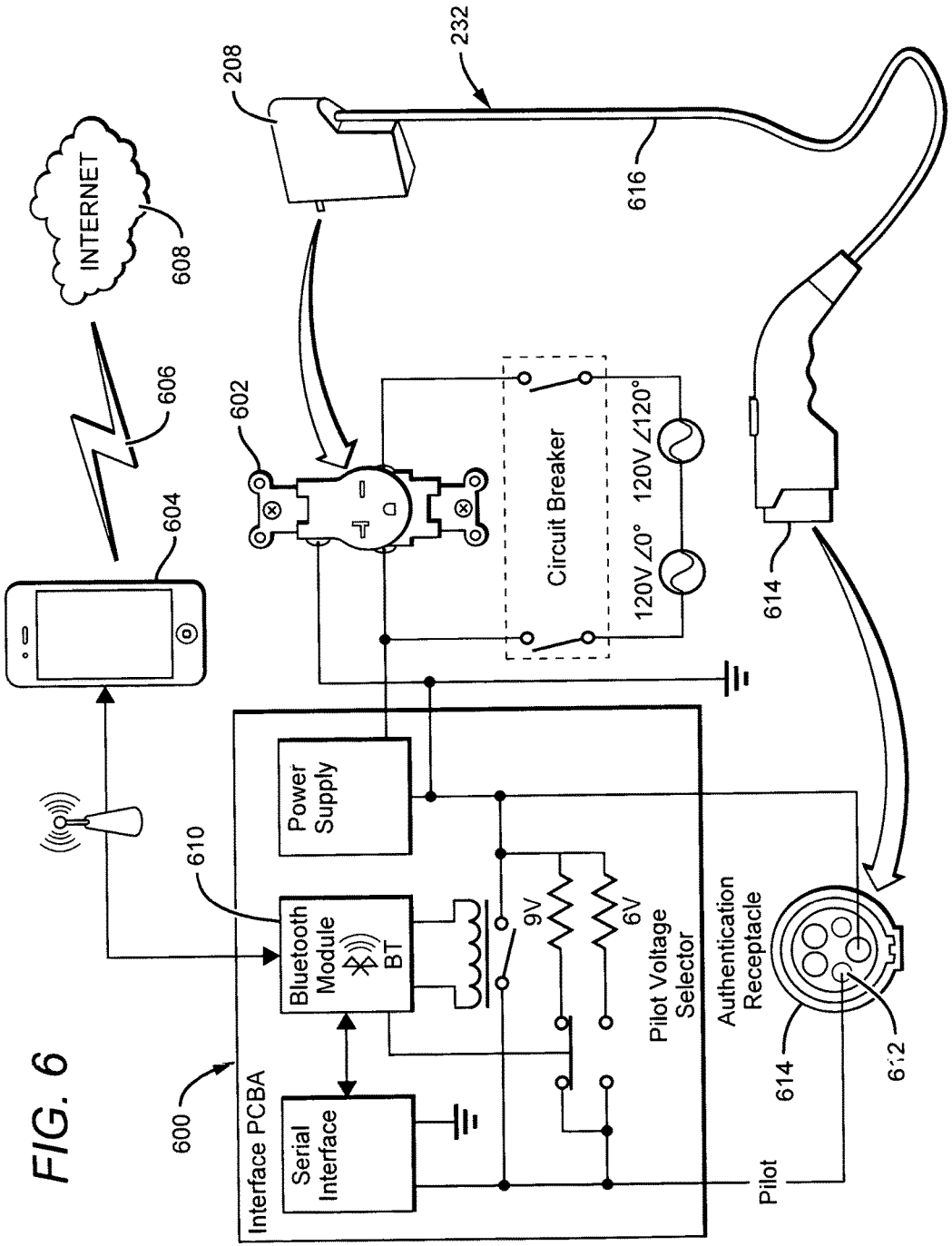
FIG. 6 is a block diagram illustrating one embodiment of an EVSE system having a wireless interface module in short-range wireless communication with a user's smartphone and connected to the connector of the power cord.

FIG. 6 shows an embodiment of an EVSE system with an expanded view of a wireless interface module connected to the cord set and EVSE control box. The wireless interface module 600 may be connected to a wall outlet 602 for power, and may be in short-range wireless communication with a user's smartphone 604. The user's smartphone 604 may be in periodic communication 606 with a home or back office via the Internet 608. In such an embodiment, the wireless interface module 600 includes a Bluetooth module 610 in electrical communication with a pilot terminal 612 of a connector 614, preferably a J1772 compliant connector, of a power cable 616. As illustrated in FIG. 6, the wireless interface module 600 is in electrical communication with an EVSE control box 208 that contains an EVSE control module (not shown).

Figure 7:
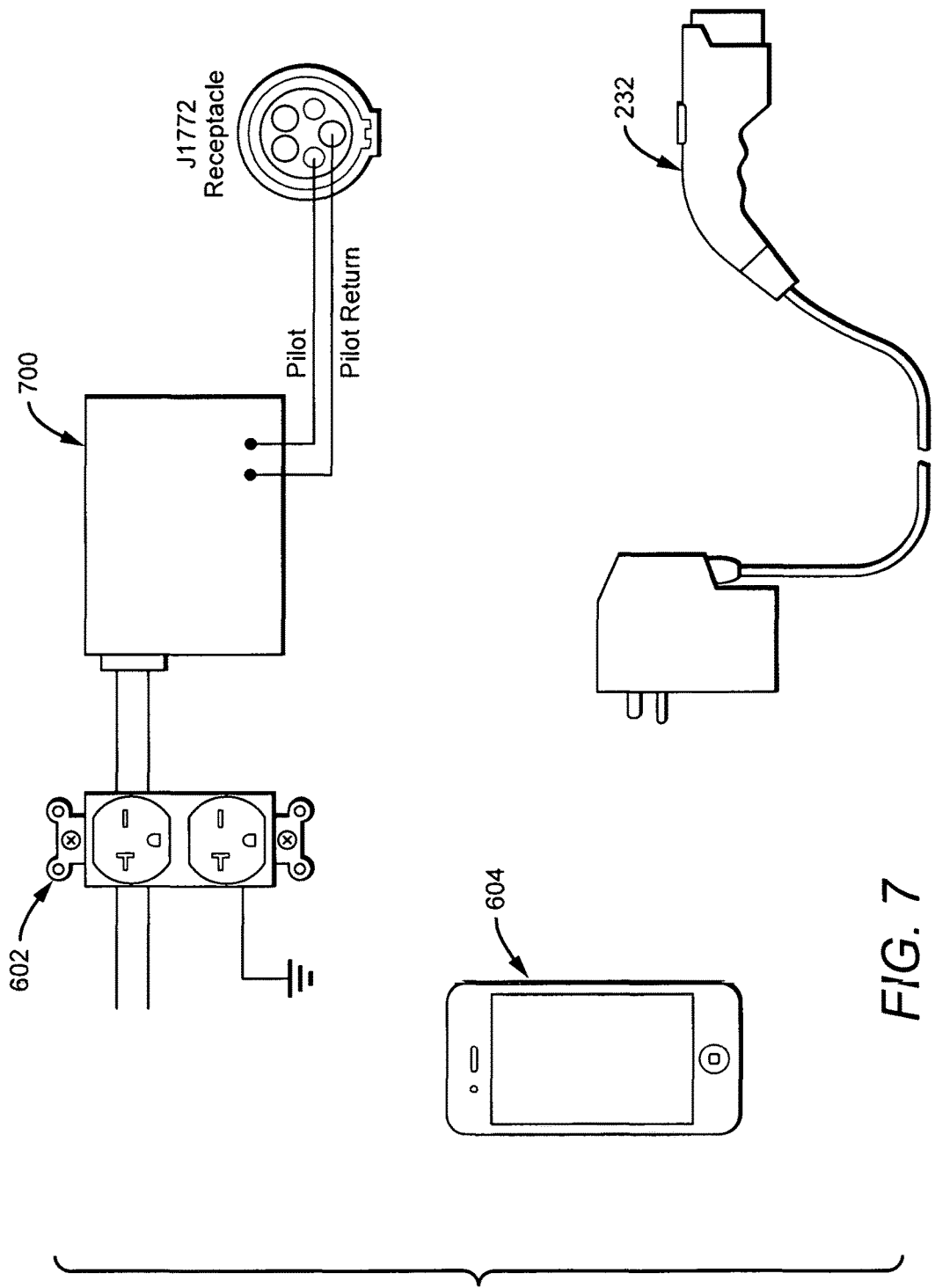
FIG. 7 is a block diagram illustrating an embodiment of an EVSE control module in communication with the connector of the power cord.

FIG. 7 shows an embodiment of the invention system diagram for an EVSE control system, with a cord set 232 and an EVSE control module 700 connected to the wall outlet 602 and in wireless communication with the user's smartphone 604.

Figure 8:
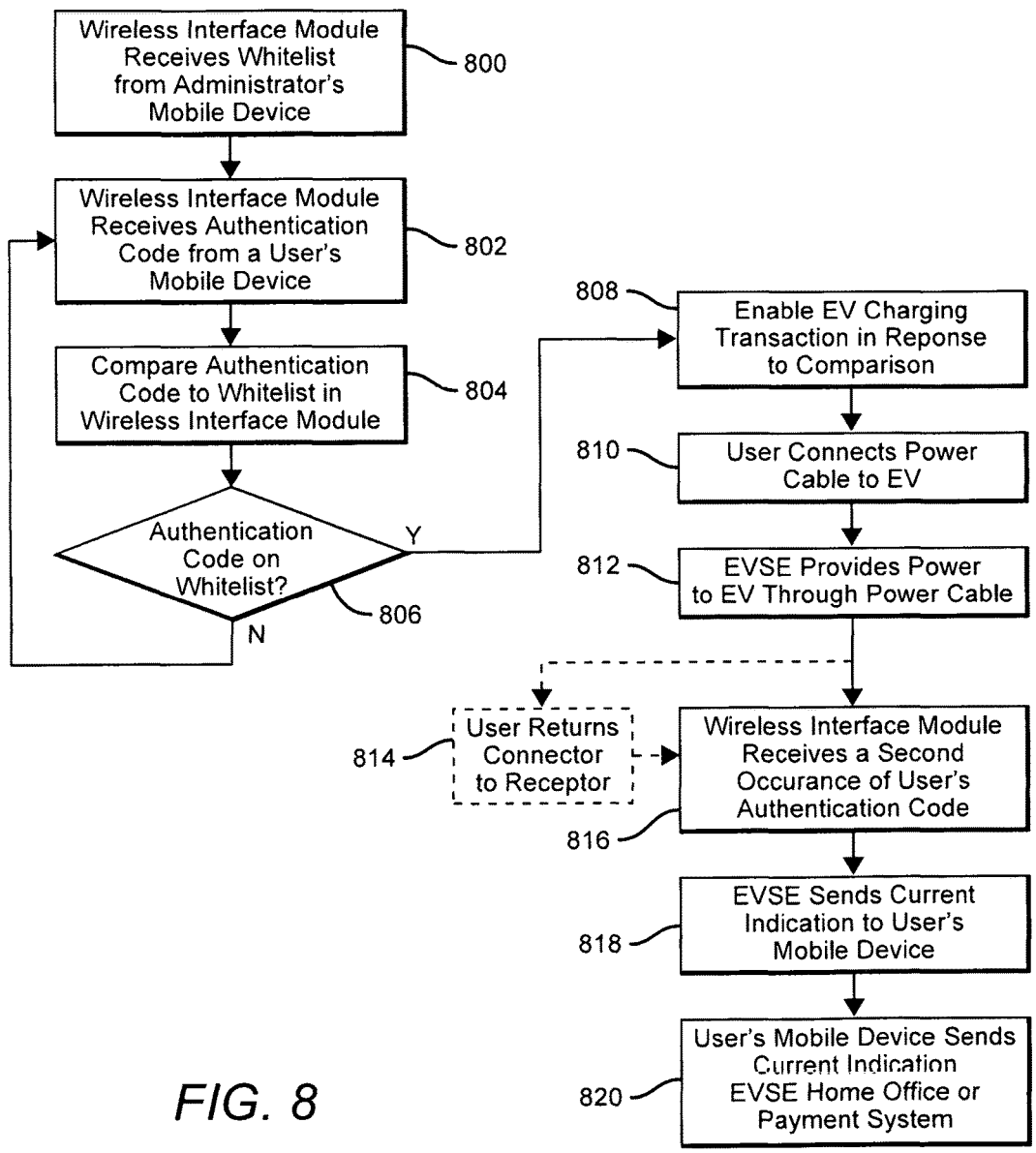
FIG. 8 is a flow chart describing one implementation of the method illustrated in FIG. 4 for administering and using an EVSE with mobile devices using the wireless interface material to store the whitelist for internal comparison to a user's authentication code.

FIG. 8 illustrates one implementation of the method illustrated in FIG. 4 for administering and using an EVSE with mobile devices. In this implementation, the whitelist is stored in the wireless interface module residing in the EVSE pedestal, and the whitelist comparison and subsequent EV charging transaction authorization are also implemented in the wireless interface module for subsequent communication to the EVSE control module rather than being implemented in the EVSE control module itself. More particularly, subsequent to purchase or installation of the EVSE pedestal at a permanent use location, or periodically after installation, the wireless interface module in the pedestal may receive and store a whitelist from an administrator's mobile device (block 800), with the whitelist including user authentication codes representing users that are authorized to charge from the EVSE, such as the EVSE owner's employees. After such setup and during normal use, the wireless interface module may broadcast an invitation for mobile devices to connect. In such an embodiment, the invitation to connect may be an invitation to connect the user's cord set to the EVSE pedestal. Or, the cord set may be previously attached to the pedestal, such as would be the case if the cord set was not portable. A user that wants to initiate an EV charging transaction (i.e., desires to charge their EV) may send an authentication code using, for example, their EVSE mobile application running in their wireless device, to be received in the EVSE's wireless interface module (block 802) in the EVSE pedestal. The user's authentication code may be compared to the authorization codes previously uploaded and existing in the whitelist in the wireless interface module (block 804). If the user's authentication code is not on the whitelist (block 806), the wireless interface module may prompt the user (through the EVSE mobile application) to again enter the authentication code or may send an authorization failed message to the user. Or, if the authentication code is found on the whitelist (block 806), the wireless interface module may send an authorization to start an EV charge transaction sign (block 808) to the EVSE control module in response to the comparison. The user may then remove the connector from the receptor and electrically couple the connector to their EV so the power cable is connected between the EV and the EVSE (block 810), and the EVSE may provide power to the EV by standard means such as may be controlled through a pilot channel established between the EV and EVSE (block 812). At the conclusion of charging, the user may disconnect the connector on the EVSE's power cable from the EV and return the connector to the receptor of the EVSE (block 814). Preferably, the wireless interface module may again receive the user's authentication code (block 816) to reestablish communication between the mobile device and the wireless interface module of the EVSE for the wireless interface module to send a current indication to the user's mobile device (block 818) that is an indication of the total charge delivered by the EVSE to the user's EV. With the current indication received, the mobile device may then send the current indication to an EVSE home office or to a payment system so that the user may be charged or otherwise debited for the EV charge transaction (block 820). In one embodiment, the communication between the mobile device and the wireless interface module is reestablished (block 816) immediately upon conclusion of EV charging so the EVSE home office or payment system may receive the current indication through the user's mobile device immediately upon conclusion of the EV charging transaction. However, in another embodiment, communication between the mobile device and the wireless interface module of the EVSE is reestablished at a subsequent time, such as at initiation of a subsequent EV charging session or transaction, and so the current indication is not immediately provided by the EVSE to the user's mobile device. In other embodiment, the user's mobile device does not immediately provide the received charging indication to the EVSE home office or payment system, but rather stores the data for later transmission, such if the mobile device is not immediately within range of cellular service.

Figure 9:
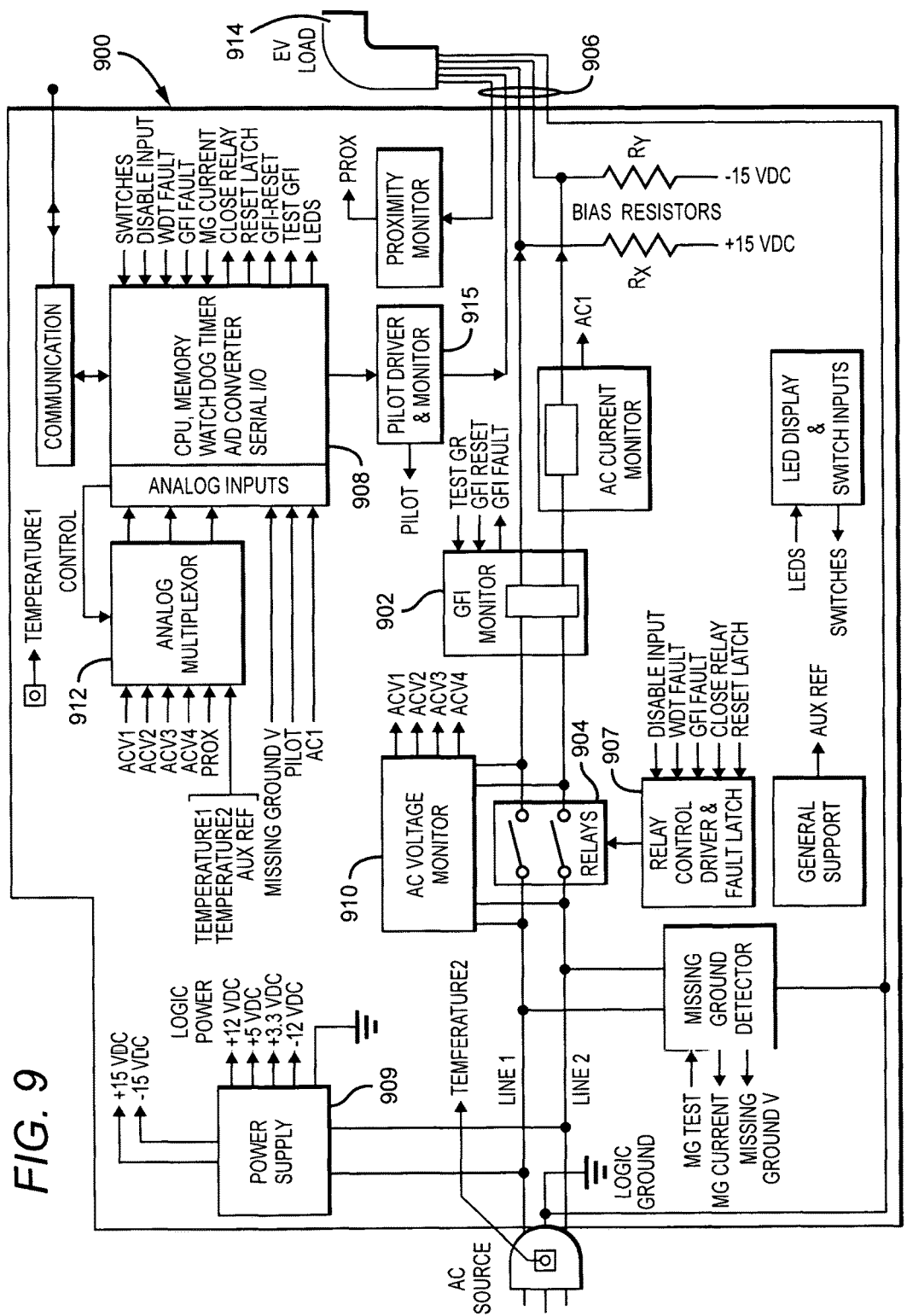
FIG. 9 is a block diagram illustrating one embodiment of an EVSE control module.

FIG. 9 illustrates one embodiment of the EVSE control module and included power relays that use AC utility power to charge the EV. The system is operable to plug into an AC source that may be 120 VAC-60 Hz, 250 VAC-60 Hz (split phase) or 230 VAC 50 Hz (80 VAC to 264 VAC) via a standard NEMA or CEE7/7 plug. The AC power is routed to a GFI Monitor 902 that is a GFI/RCD (Ground Fault Interrupter/Residual Current Device current sensor) through power relays 904 for presentation to an EV power cable 906. The power relays 904 are normally open (N. O.) when de-energized, so logic power must be present in order to initiate and maintain the relay-closed condition, such as in response to a communication from a wireless control module or in response a comparison of an authentication code to a whitelist in the EVSE control module memory. The mechanical relays open/close operation is driven by the relay control driver and fault latch 907. The GFI monitor 902 relay control driver and fault latch controller 907 collectively provide a robust hardware safety system. A controller 908 receives line voltage signals from an AC voltage monitor 910 through an analog multiplexor 912, with the AC voltage monitor 910 monitoring the voltage on Line 1 and Line 2 and across the relays 904 for communication to the controller 908. The controller 908 includes a microprocessor and control monitoring electronics, with logic power being supplied by a POWER SUPPLY 909 that may be a flyback transformer based power supply to allow for use of the EVSE system 900 in different power environments. The prime function of the controller 908 is to use the inputs from the vehicle connector and utility to allow or disallow the relays to open and close, and in one embodiment, to compare a user's authentication code to a whitelist stored in internal memory to enable an EV charging transaction. In another embodiment, the controller 908 may receive an EV charging transaction in response to a communication from a wireless interface module, with the wireless interface module performing the comparison between a user's authentication code and a whitelist stored the internal memory of the wireless interface module. The controller 908 obtains its operating power from the utility at the input of the EVSE system 900.

A connector 914 such as an SAE-J1772 or IEC-62196 Type II, Mode 2 compliant connector is in communication with the EV power cable 906 to feed the AC power to an EV (not shown) that may be coupled to the charge coupler. The EV (now shown) may contain an on-board charger that then converts the AC power to DC power to charge the vehicle batteries. For example, in preparation to operate the EVSE system 900, the connector 914 is attached by the user to the vehicle receptacle for charging sessions. The vehicle is the primary system component per SAE-J1772/IEC62196 that communicates charging status and completion to the user, however the controller 908 may be designed to provide a primary pilot signal through the pilot driver and monitor 915, with the pilot signal established between the EVSE and the vehicle per SAE-J1772 prior to closing the relays 904. The pilot signal is passed through the power cable 906 to the vehicle, and may have a peak amplitude of +/−12 V and a PWM (Pulse Width Modulation). Per SAE-J1772, the duty cycle of the pilot PWM signal is used by the EVSE system 900 to communicate the maximum power amperage limit that the EVSE system 900 may supply to the vehicle. The pilot signal voltage amplitude and modulation characteristics are used to indicate a proper connection, charging requirements and default status between the vehicle and the EVSE system 900.

We claim:

1. A method of charging an electric vehicle (EV), comprising:
receiving a user's authentication code in a wireless interface module from a user's mobile device, the wireless interface module in communication with an electric vehicle service equipment (EVSE);
comparing in the wireless interface module the user's authentication code to a whitelist stored in the wireless interface module, the whitelist having a plurality of authorized user authentication codes;

enabling an EV charging transaction serviced by the EVSE in response to the comparing of the user's authentication code to the whitelist;

wherein the user's authentication code is authenticated to enable the EV charging transaction without concurrent access to an EVSE-related remote server;

providing power through a power cable in response to enabling the EV charging transaction;

receiving a second occurrence of the user's authentication code in the wireless interface module from the user's mobile device; and sending by the wireless interface module an electrical current indication to the user's mobile device of a previous EV charging transaction in response to receiving the second occurrence of the user's authentication code.

2. The method of claim 1, wherein the wireless interface module is selected from the group consisting of a Bluetooth wireless module and a Wi-Fi wireless module.

3. The method of claim 1, wherein the user's authentication code is received in the wireless interface module directly from the user's mobile device.

4. The method of claim 1, further comprising:
entering the user's authentication code into the user's-a mobile device;
establishing a wireless communication between the EVSE and the user's mobile device;
sending the user's authentication code from the user's mobile device to the EVSE; and
receiving in the user's mobile device a charge amount indication.

5. The method of claim 4, wherein the charge amount indication is a current indication and current charge time.

6. The method of claim 4, wherein the charge amount indication is a total power consumed indication.

7. The method of claim 4, further comprising:
receiving in the user's mobile device an EVSE invitation to connect signal;
accepting the EVSE invitation to connect signal;
requesting by the user's mobile device an EV charge rate from a charge rate service provider; and
receiving the EV charge rate in the user's mobile device.

8. The method of claim 4, wherein sending the user's authentication code from the user's mobile device to the EVSE is made in response to selection of a charge rate.

9. The method of claim 1, wherein the wireless interface module is in communication with the EVSE via
a wireless personal area network (PAN) module of the EVSE, wherein
an EVSE control module is in electrical communication with the PAN module.

10. The method of claim 9, wherein the PAN module is in communication with the EVSE control module through a pilot line in communication with the EVSE control module.

11. The method of claim 9, wherein the EVSE control module comprises the PAN module.

12. The method of claim 9, wherein an EVSE power relay is seated in an EVSE control box and the EVSE control box is detachably coupled to a power receptacle.

13. The method of claim 9, wherein the PAN module is a Bluetooth interface module.

14. The method of claim 9, wherein the PAN module is a Wi-Fi interface module.

* * * * *